(12) United States Patent
Hudson et al.

(10) Patent No.: US 8,479,246 B2
(45) Date of Patent: *Jul. 2, 2013

(54) SYSTEM AND METHOD FOR INTERACTIVE VIDEO CONTENT PROGRAMMING

(75) Inventors: Ron J. Hudson, Los Angeles, CA (US); Terrence T. Coles, Costa Mesa, CA (US); Craig D. Berry, Los Angeles, CA (US); Allen D. Easty, Carolton, TX (US)

(73) Assignee: Intertainer, Inc., Los Angeles, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/495,884

(22) Filed: Jun. 13, 2012

(65) Prior Publication Data

US 2012/0254932 A1 Oct. 4, 2012

Related U.S. Application Data

(63) Continuation of application No. 13/228,181, filed on Sep. 8, 2011, which is a continuation of application No. 12/930,456, filed on Jan. 7, 2011, now abandoned, which is a continuation of application No. 09/921,097, filed on Jul. 31, 2001, now Pat. No. 7,870,592.

(60) Provisional application No. 60/255,541, filed on Dec. 14, 2000.

(51) Int. Cl.
*H04N 7/173* (2011.01)
*H04N 5/445* (2011.01)

(52) U.S. Cl.
USPC .............. 725/113; 725/59; 725/102; 725/103

(58) Field of Classification Search
USPC ................ 725/60, 87, 112, 59, 102–103, 113
See application file for complete search history.

(56) References Cited

U.S. PATENT DOCUMENTS

| 5,027,400 | A | 6/1991 | Baji |
| 5,191,573 | A | 3/1993 | Hair |
| 5,235,680 | A | 8/1993 | Bijnagte |
| 5,253,275 | A | 10/1993 | Yurt et al. |

(Continued)

FOREIGN PATENT DOCUMENTS

| EP | 0 840 241 A1 | 5/1998 |
| EP | 1 016 990 A2 | 7/2000 |

(Continued)

OTHER PUBLICATIONS

U.S. Appl. No. 09/605,695, filed Jun. 2000, Schein.

(Continued)

*Primary Examiner* — Chris Parry
*Assistant Examiner* — Sumaiya A Chowdhury
(74) *Attorney, Agent, or Firm* — Martin & Ferraro, LLP

(57) ABSTRACT

The present invention is directed to a system and method for interacting with video by displaying one or more interface links associated with video content being displayed, pausing the video content when an interface link is interacted with, allowing the user to view ancillary content the interface link is linked to over a network, and un-pausing the video content after the user elects to continue viewing the video content. In one or more embodiments, the ancillary content may permit e-commerce, display additional video or other images, and/or include links to additional ancillary content. The present invention also includes a method for creating an interactive video.

30 Claims, 4 Drawing Sheets

U.S. PATENT DOCUMENTS

| | | |
|---|---|---|
| 5,289,371 A | 2/1994 | Abel et al. |
| 5,307,495 A | 4/1994 | Seino et al. |
| 5,347,632 A | 9/1994 | Filepp et al. |
| 5,371,532 A | 12/1994 | Gelman et al. |
| 5,408,630 A | 4/1995 | Moss |
| 5,446,919 A | 8/1995 | Wilkins |
| 5,539,450 A | 7/1996 | Handelman |
| 5,539,735 A | 7/1996 | Moskowitz |
| 5,539,871 A | 7/1996 | Gibson |
| 5,553,281 A | 9/1996 | Brown et al. |
| 5,557,541 A | 9/1996 | Schulhof et al. |
| 5,576,951 A | 11/1996 | Lockwood |
| 5,584,025 A | 12/1996 | Keithley et al. |
| 5,616,876 A | 4/1997 | Cluts |
| 5,636,346 A | 6/1997 | Saxe |
| 5,652,615 A | 7/1997 | Bryant et al. |
| 5,696,965 A | 12/1997 | Dedrick |
| 5,706,448 A | 1/1998 | Blades |
| 5,708,845 A | 1/1998 | Wistendahl et al. |
| 5,710,884 A | 1/1998 | Dedrick |
| 5,710,887 A | 1/1998 | Chelliah et al. |
| 5,717,923 A | 2/1998 | Dedrick |
| 5,724,521 A | 3/1998 | Dedrick |
| 5,729,594 A | 3/1998 | Klingman |
| 5,734,961 A | 3/1998 | Castille |
| 5,745,710 A * | 4/1998 | Clanton et al. .................. 725/60 |
| 5,752,238 A | 5/1998 | Dedrick |
| 5,754,787 A | 5/1998 | Dedrick |
| 5,754,938 A | 5/1998 | Herz et al. |
| 5,758,257 A | 5/1998 | Herz et al. |
| 5,765,152 A | 6/1998 | Erickson |
| 5,767,845 A | 6/1998 | Oashi et al. |
| 5,781,228 A | 7/1998 | Sposato |
| 5,790,423 A | 8/1998 | Lau et al. |
| 5,790,426 A | 8/1998 | Robinson |
| 5,790,935 A | 8/1998 | Payton |
| 5,802,518 A | 9/1998 | Karaev et al. |
| 5,805,154 A | 9/1998 | Brown |
| 5,815,665 A | 9/1998 | Teper et al. |
| 5,818,935 A | 10/1998 | Maa |
| 5,819,271 A | 10/1998 | Mahoney et al. |
| 5,825,876 A | 10/1998 | Peterson, Jr. |
| 5,826,243 A | 10/1998 | Musmanno et al. |
| 5,848,396 A | 12/1998 | Gerace |
| 5,864,823 A | 1/1999 | Levitan |
| 5,864,871 A | 1/1999 | Kitain et al. |
| 5,892,508 A | 4/1999 | Howe et al. |
| 5,892,900 A | 4/1999 | Ginter et al. |
| 5,894,589 A | 4/1999 | Reber et al. |
| 5,910,987 A | 6/1999 | Ginter et al. |
| 5,918,012 A | 6/1999 | Astiz et al. |
| 5,918,014 A | 6/1999 | Robinson |
| 5,926,624 A | 7/1999 | Katz et al. |
| 5,929,849 A | 7/1999 | Kikinis |
| 5,933,811 A | 8/1999 | Angles et al. |
| 5,953,710 A | 9/1999 | Fleming |
| 5,956,693 A | 9/1999 | Geerlings |
| 5,956,700 A | 9/1999 | Landry |
| 5,956,716 A | 9/1999 | Kenner et al. |
| 5,966,440 A | 10/1999 | Hair |
| 5,973,683 A | 10/1999 | Cragun et al. |
| 5,974,396 A | 10/1999 | Anderson et al. |
| 5,987,509 A * | 11/1999 | Portuesi ........................ 725/113 |
| 6,006,265 A | 12/1999 | Rangan et al. |
| 6,009,407 A | 12/1999 | Garg |
| 6,011,537 A | 1/2000 | Slotznick |
| 6,018,768 A | 1/2000 | Ullman et al. |
| 6,026,369 A | 2/2000 | Capek |
| 6,029,045 A | 2/2000 | Picco et al. |
| 6,047,296 A | 4/2000 | Wilmott et al. |
| 6,058,424 A | 5/2000 | Dixon et al. |
| 6,065,042 A | 5/2000 | Reimer et al. |
| 6,094,677 A | 7/2000 | Capek et al. |
| 6,134,593 A | 10/2000 | Alexander et al. |
| 6,154,738 A | 11/2000 | Call |
| 6,154,771 A | 11/2000 | Rangan et al. |
| 6,157,929 A | 12/2000 | Zamiska et al. |
| 6,163,272 A | 12/2000 | Goode et al. |
| 6,163,795 A | 12/2000 | Kikinis |
| 6,166,730 A | 12/2000 | Goode et al. |
| 6,169,573 B1 | 1/2001 | Sampath-Kumar et al. |
| 6,175,840 B1 | 1/2001 | Chen et al. |
| 6,178,407 B1 | 1/2001 | Lotvin et al. |
| 6,184,878 B1 | 2/2001 | Alonso et al. |
| 6,185,541 B1 | 2/2001 | Scroggie et al. |
| 6,189,008 B1 | 2/2001 | Easty et al. |
| 6,199,082 B1 | 3/2001 | Ferrel et al. |
| 6,202,056 B1 | 3/2001 | Nuttall |
| 6,205,432 B1 | 3/2001 | Gabbard et al. |
| 6,226,618 B1 | 5/2001 | Downs et al. |
| 6,229,895 B1 | 5/2001 | Son et al. |
| 6,237,022 B1 | 5/2001 | Bruck et al. |
| 6,243,725 B1 | 6/2001 | Hempleman et al. |
| 6,247,130 B1 | 6/2001 | Fritsch |
| 6,269,275 B1 | 7/2001 | Slade |
| 6,269,394 B1 | 7/2001 | Kenner |
| 6,292,785 B1 | 9/2001 | McEvoy et al. |
| 6,292,797 B1 | 9/2001 | Tuzhilin et al. |
| 6,314,451 B1 | 11/2001 | Landsman et al. |
| 6,317,780 B1 | 11/2001 | Cohn et al. |
| 6,334,116 B1 | 12/2001 | Ganesan et al. |
| 6,337,901 B1 | 1/2002 | Rome et al. |
| 6,338,044 B1 | 1/2002 | Cook et al. |
| 6,338,094 B1 | 1/2002 | Scott et al. |
| 6,345,256 B1 | 2/2002 | Milsted |
| 6,349,410 B1 | 2/2002 | Lortz |
| 6,381,747 B1 | 4/2002 | Wonfor et al. |
| 6,385,596 B1 | 5/2002 | Wiser et al. |
| 6,389,403 B1 | 5/2002 | Dorak |
| 6,418,421 B1 | 7/2002 | Hurtado |
| 6,424,998 B2 | 7/2002 | Hunter |
| 6,457,010 B1 | 9/2002 | Eldering et al. |
| 6,462,754 B1 | 10/2002 | Chakraborty et al. |
| 6,483,986 B1 | 11/2002 | Krapf |
| 6,490,587 B2 | 12/2002 | Easty et al. |
| 6,496,802 B1 | 12/2002 | Van Zoest |
| 6,496,981 B1 | 12/2002 | Wistendahl et al. |
| 6,526,438 B1 | 2/2003 | Bienvenu et al. |
| 6,535,856 B1 | 3/2003 | Tal |
| 6,536,041 B1 | 3/2003 | Knudson et al. |
| 6,570,587 B1 | 5/2003 | Efrat et al. |
| 6,572,662 B2 | 6/2003 | Manohar et al. |
| 6,574,424 B1 | 6/2003 | Dimitri et al. |
| 6,604,224 B1 | 8/2003 | Armstrong et al. |
| 6,615,251 B1 | 9/2003 | Klug et al. |
| 6,628,302 B2 | 9/2003 | White et al. |
| 6,636,237 B1 | 10/2003 | Murray et al. |
| 6,637,032 B1 | 10/2003 | Feinleib |
| 6,640,145 B2 | 10/2003 | Hoffberg et al. |
| 6,650,640 B1 | 11/2003 | Muller et al. |
| 6,718,551 B1 | 4/2004 | Swix et al. |
| 6,763,345 B1 | 7/2004 | Hempleman et al. |
| 6,799,165 B1 | 9/2004 | Boesjes |
| 6,801,576 B1 | 10/2004 | Haldeman et al. |
| 6,810,527 B1 | 10/2004 | Conrad et al. |
| 6,845,485 B1 | 1/2005 | Shastri et al. |
| 6,853,728 B1 | 2/2005 | Kahn et al. |
| 6,925,469 B2 | 8/2005 | Headings et al. |
| 6,944,585 B1 | 9/2005 | Pawson |
| 6,959,288 B1 | 10/2005 | Medina |
| 6,973,669 B2 | 12/2005 | Daniels |
| 6,986,156 B1 | 1/2006 | Rodriguez et al. |
| 7,010,801 B1 | 3/2006 | Jerding et al. |
| 7,017,173 B1 * | 3/2006 | Armstrong et al. ............. 725/87 |
| 7,017,188 B1 | 3/2006 | Schmeidler et al. |
| 7,069,249 B2 | 6/2006 | Stolfo et al. |
| 7,089,579 B1 | 8/2006 | Mao et al. |
| 7,099,847 B2 | 8/2006 | Darling |
| 7,103,905 B2 | 9/2006 | Novak |
| 7,103,906 B1 | 9/2006 | Katz et al. |
| 7,139,813 B1 * | 11/2006 | Wallenius .................... 709/219 |
| 7,203,758 B2 | 4/2007 | Cook et al. |
| 7,207,006 B1 | 4/2007 | Feig et al. |
| 7,243,365 B1 | 7/2007 | Rahman |
| 7,254,622 B2 | 8/2007 | Nomura et al. |
| 7,275,254 B1 | 9/2007 | Jutzi |
| 7,325,245 B1 | 1/2008 | Clapper |

| | | | |
|---|---|---|---|
| 7,343,614 | B1 | 3/2008 | Hendricks et al. |
| 7,395,545 | B2 | 7/2008 | Wonfor et al. |
| 7,661,117 | B2 | 2/2010 | Markel |
| 7,694,319 | B1 | 4/2010 | Hassell et al. |
| 7,730,515 | B1 | 6/2010 | MacCormack et al. |
| 7,870,592 | B2 | 1/2011 | Hudson et al. |
| 8,175,921 | B1 | 5/2012 | Kopra |
| 8,191,091 | B1 | 5/2012 | Harvey et al. |
| 2001/0003214 | A1 | 6/2001 | Shastri et al. |
| 2001/0016947 | A1 | 8/2001 | Nishikawa et al. |
| 2001/0025255 | A1 | 9/2001 | Gaudian |
| 2001/0033296 | A1 | 10/2001 | Fullerton et al. |
| 2001/0042043 | A1 | 11/2001 | Shear et al. |
| 2002/0007493 | A1 | 1/2002 | Butler et al. |
| 2002/0016736 | A1 | 2/2002 | Cannon et al. |
| 2002/0056118 | A1 | 5/2002 | Hunter et al. |
| 2002/0059574 | A1 | 5/2002 | Tudor et al. |
| 2002/0062393 | A1 | 5/2002 | Borger et al. |
| 2002/0065715 | A1 | 5/2002 | Tennyson et al. |
| 2002/0072997 | A1 | 6/2002 | Colson et al. |
| 2002/0083006 | A1 | 6/2002 | Headings et al. |
| 2002/0085024 | A1 | 7/2002 | White et al. |
| 2002/0087976 | A1 | 7/2002 | Kaplan et al. |
| 2002/0095606 | A1 | 7/2002 | Carlton |
| 2002/0100046 | A1 | 7/2002 | Dudkiewicz |
| 2002/0112235 | A1 | 8/2002 | Ballou et al. |
| 2002/0120564 | A1 | 8/2002 | Strietzel |
| 2002/0143647 | A1 | 10/2002 | Headings et al. |
| 2002/0143782 | A1 | 10/2002 | Headings et al. |
| 2002/0144283 | A1 | 10/2002 | Headings et al. |
| 2002/0152474 | A1 | 10/2002 | Dudkiewicz |
| 2002/0184255 | A1 | 12/2002 | Edd et al. |
| 2003/0014328 | A1 | 1/2003 | Lindner |
| 2003/0070167 | A1 | 4/2003 | Holtz et al. |
| 2003/0097657 | A1 | 5/2003 | Zhou et al. |
| 2003/0120549 | A1 | 6/2003 | Lindner |
| 2003/0120557 | A1 | 6/2003 | Evans et al. |
| 2003/0126033 | A1 | 7/2003 | Evans et al. |
| 2003/0191816 | A1 | 10/2003 | Landress et al. |
| 2005/0262024 | A1 | 11/2005 | Headings et al. |
| 2009/0138925 | A1 | 5/2009 | Headings et al. |
| 2009/0138964 | A1 | 5/2009 | Headings et al. |
| 2009/0144154 | A1 | 6/2009 | Schein |
| 2009/0150219 | A1 | 6/2009 | Headings et al. |
| 2010/0036724 | A1 | 2/2010 | Headings et al. |
| 2011/0321109 | A1 | 12/2011 | Hudson et al. |

FOREIGN PATENT DOCUMENTS

| | | |
|---|---|---|
| EP | 1 037 419 A2 | 9/2000 |
| JP | 11-316579 | 11/1999 |
| WO | WO 99/10822 A1 | 3/1999 |
| WO | WO 00/02143 A1 | 1/2000 |
| WO | WO 01/27773 A1 | 4/2001 |
| WO | WO 01/61592 A1 | 8/2001 |

OTHER PUBLICATIONS

Apple Inc., Google Inc., and Napster Inc.'s Invalidity Contentions, from *Intertainer, Inc.* v. *Apple Computer, Inc., Google Inc., and Napster Inc.*, In the United States District Court for the Eastern District of Texas Marshali Division, Civil Action No. 2-06CV-549 TJW (Oct. 9, 2007).

*Intertainer, Inc.* v. *Hulu, LLC*, In the United States District Court for the Central District of California Southern Division, Defendant Hulu, LLC's Responses to Plaintiff Intertainer, Inc.'s First Set of Interrogatories, Case No. SACV 11-01208 CJC (RNBx) (Mar. 19, 2012).

*Intertainer, Inc.* v. *Hulu, LLC*, In the United States District Court for the Central District of California Southern Division, Defendant Hulu LLC's First Supplemental Responses to Plaintiff Intertainer, Inc.'s Interrogatories Nos. 2 and 3, Case No. SACV 11-01208 CJC (RNBx) (Apr. 20, 2012).

Anamaria Wilson, In Brief, Time Magazine (Mar. 20, 2000), available at http://www.time.com/time/magazine/articie/0,9171,996415,00.html (p. 1).

"Buying Music over the Internet", R. Colombo, Liquid Audio White Paper, 1997.

"Dig-Music: An On Demand Digital Musical Selection System Utilizing CATV Facilities," *IEEE Transactions on Consumer Electronics*, vol. CE-28, Issue 3, pp. xviii-xxvi (Aug. 1982).

"Final Report: Digital Audio Visual Work Trading by ATM—ATMAN," obtained from ftp://ftp.cordis.europa.eu/pub/infowin/docs/fr-225.pdf (Feb. 1999).

"Liquid Audio: Products & Services," http://web.archive.org/web/20000302001521/www.liquidaudio.com/services/anl/anl.html (and linked pages), stored on archive.org on Mar. 2, 2000.

A.J.S. Ball, G.V. Bachmann and Jan Gecsei, "Videotex Networks," IEEE Computer, vol. 13, Issue 12, Dec. 1980, pp. 8-14.

Bargeron, David et al., Annotations for Streaming Video on the Web: System Design and Usage Studies (Elsevier Science B.V.) 11 pp. (Mar. 1999).

Bove, W. Michael et al., Adding Hyperlinks to Digital Television, Proc. 140th SMPTE Technical Conference 11 pp. (1998).

Buchanan, M. Cecelia et al, Specifying Temporal Behavior in Hypermedia Documents, ACM ECHT Conference 12 pp. (1992).

Bulterman, Dick C.A. et al., GRiNS: A Graphical Interface for creating an playing SMIL documents, Computer Networks and ISDN Systems 30, 14 pp. (1998).

Bulterman, Dick, C.A. Models, Media and Moton: Using the Web to Support Multimedia Documents, Multimedia Modeling 97, 20 pp. (Nov. 1997).

C. Federighi and L.A. Rowe, "A Distributed Hierarchical Storage Manager for a Video-on-Demand System," Proc. of IS&T/SPIE 1994 Int'l Symp. on Elec. Imaging: Science and Technology, San Jose, CA, Feb. 1994, Also appears in Storage and Retrieval for Image and Video Databases II, The International Society for Optical Engineering, vol. 2185, pp. 185-197, 1994.

C. Fenger and M. Elwood-Smith, "The Fantastic Broadband Multimedia System: Software Platform Description" (v. 1,3), The Fantastic Corporation, May 19, 2000.

Caravello-Hibbert, Stephanie M., Teaching Non-Science Majors: Science Through Interactive Multi-Media, A Quarterly Devoted to Microcomputers in the Higher Eduction Curriculum, Vo. X, No. 2, pp, 97-102 (May 1992).

Cardillo, Darlene S., Using a Foreign Film to Improve Second Language Proficiency: Video vs. Interactive Multimedia, J. Educational Technology Systems, vol. 25(2), 1996, pp. 169-177.

Chang, Edward Y., πDTV: A Client-Based Interactive DTV Architecture, Multimedia '99 4 pp. (1999).

Dakss, Jonathan et al., HyperActive: An Automated Tool for Creating Hyperlinked Video, Media 1997 pp. 1-101 (Sep. 1999).

Dakss, Jonathan et al, Hyperlinked Video, Proc. SPIE, vol. 3528, 9 pp. (Nov. 1998).

Diva Systems Corp. website (http://web.archive.org/web/19980509053455/divatv.com/onsetlayer2-3.htm), archived by web.archive.org, in May 1998 (3 pages).

Diva Systems Corp., Form 10-K (Sep. 28, 1999). Available at http://www.sec.gov.

Earthnoise.com, archived by archve.org on various dates between Apr. 23, 2000 and May 11, 2003 (19 pages).

Echiffre, Marica et al., MHEG-5—Aims, Concepts; and Implementation issues, Journal IEEE Multimedia, vol. 5, No. 1, pp. 84-91 (Jan.-Mar. 1998).

Francisco-Revilla, Luis, A Picture of Hypervideo Today, 12 pp, (1998) at http:/www.csdl.tamu.edu/~10f0954/academic/cpsc610/p-1.htm.

Frank J. Derfler, Jr. & Les Freed, *How Networks Work*, 4th Ed. Que Corporation (Macmillian Computer Publishing) (1998).

Freeman, Mark et al., Seamless Video Expansion: Shaping the Contours of Streams for Personalized TV, ACM SIGCHI (Human Factors in Computer Systems) pp. 5-15 (2000).

G, Caire, "ATMAN: Trading of Digital Audio Visual Contents," Multimedia Applications, Services and Techniques—ECMAST '98, David Hutchison, Ralf Schafer (Eds.), 352-365, May 1998.

Goldsworthy, Richard, Designing Instruction for Emotional Intelligence, Educational Technology, vol. 40, No. 5, pp. 43-48 (Sep.-Oct. 2000).

H. Jiang & A.K. Elmagarmid, "WVTDB—A Semantic Content-Based Video Database System on the World Wide Web," IEEE Transactions on Knowledge and Data Engineering, vol. 10, No. 6, Nov./Dec. 1998.

Hardman, Lynda et al., Hypermedia: The Link with Time, ACM Computing Surveys, vol. 31, No. 4ES. 5 pp. (Dec. 1999).

Hardman, Lynda et al., Links in Hypermedia: The Requirement for Context, Hypertest '93 Proceedings, pp. 183-191 (Nov. 1993).

Hauglid et al., "WebSTAR—Video Database on WWW," IS&T/SPIE Conference on Multimedia Computing and Networking 2000, San Jose, California, Jan. 2000.

IMAKE.COM, as archived by archive.org, available at http://web.archive.org/web/19980110131456/www.imake.com/media/products/dbs.html, 1998.

Intertainer press release web page for 1998 (http//:www.intertainer.com/pr1998.html): press release dated Feb. 11, 1998, "Intertainer Unveils World's First Interactive Broadband Service for On-Demand Delivery of Full Motion Video-Based Entertainment" (http://www.intertainer.com/news/30.html).

Intertainer, www.intertainer.com, archived by web.archive.org on various dates between Feb. 21, 1999 and Jun. 21, 1999 (pp. 1-858).

Intertainer, Inc., May 24, 1999 Press Release, "Big Entertainment's Bige.corn Expands Distribution Reach on Intertainer's On-Demand Entertainment Broadband Network," available at http://www.intertainer.com/news/19.html, 2 pages.

Intertainer website, "Advertising Information," available at http://web.archive.org/webI20000229142855/www.intertainer.com/service/advertising.html, Feb. 2000, 1 page.

J. Gecsei, *The Architecture of Videotex Systems*, Prentice-Hall, Inc. (1983).

Jeff Patterson & Ryan Melcher, *Audio on the Web*, Peachpit Press, 1998.

Johnson, Judi Mathis, ed., Software Reviews, The Computing Teacher pp. 49-55 (Oct. 1994).

Jose Alvear, ShareYourWorld and Make Money From Your Home Videos, StreamingMedia.com Research Center (Mar. 7, 2000), at http://www.streamingmedia.com/article.asp?id=5028&page=1 (pp. 1-2).

José Maria González, "The Berkeley Video on Demand System Implementation," May 22, 2000 (pp. 1-22).

L.A. Rowe, J. Boreczky, and C. Eads, "Indexes for User Access to Large Video Databases," *Proc. of IS&T/SPIE 1994 Int'l Symp. on Elec. Imaging: Science and Technology*, San Jose, CA, Feb. 1994. Also appears in Storage and Retrieval for Image and Video Databases II, The International Society for Optical Engineering, vol. 2185, pp. 150-161, 1994.

Lawton, George, Video Streams into the Mainstream, Computer, vol. 33, No. 7, pp. 12-17 (Jul. 2000).

Lewis, Paul A. et al., Media-based Navigation with Generic Links, Hypertext '96 pp. 215-223 (1996).

Liquid Audio, Inc., Liquifier Pro User Manual Version 1.2, Jun. 1997.

Little et al., "Prospects for Interactive Video-on-Demand," IEEE Multimedia, Fall 1994, 22 pages.

Loudeye Corp., Form 10-K (Feb. 27, 2001): available at http://www.sec.gov.

M. Carrer et al., "An Annotation Engine for Supporting Video Database Population," *Multimedia Tools and Applications*, vol. 5, No. 3, Nov. 1997, pp. 233-258. (available at hulk.bu.edu/pubs/papers/1997/TR-08-15-96.pdf).

M. Re, "Business-to-Business Digital Video Mega-Stores," *Advances in Information Technologies: The Business Challenge*, J.-Y. Roger et al. (Eds.), (IOS Press 1998).

Ma,. Wei-hsiu et al., Networked Hyper QuickTime: Video-Based Hypermedia Authoring and Delivery for Education-on-Demand, 19 pages (UMSI 99/52 Apr. 1999).

Ma, Wei-hsiu et al., Video-Based Hypermedia for Education-on-Demand, IEEE MuitiMedia, pp. 72-83, Jan.-Mar. 1998.

Makofske, David B. et al., From Broadcast Television to Internet Audio/Video: Techniques and Tools for VCR-Style Interactivity, 24 pp. (Oct. 1999).

Manolescu, Dragon-Anton et al., Link Management Framework for Hyper-media Documents, Proceedings IEEE International Conference on Multimedia Computing and Systems '97. Jun. 3-6, 1997, 8 pages, (1997).

Meyer, Thomas et al., A Taxonomy on Multimedia Synchronization, Proceedings of the Fourth Workshop on Fugure Trends of Distributed Computing Systems, Sep. 22-24, 1993, pp. 97-103 (1993).

Michael Robertson & Ron Simpson, *The Official MP3.com Guide to MP3*, Sybil Sosin ed., MP3.com, Inc., 1999.

MP3.com—Artist Area FAQ, http://web.archive.org/web/20010605151513/studio.mp3.com/cgi-bin/artistadmin/support.cgi?step=FAQ, (Archived by web.archive.org on Jun. 5, 2001) (pp. 1-40).

Milenkovic, "Delivering Interactive Services via a Digital TV Infrastructure," IEEE, Fall 1998, 10 pages.

Miller, Gene et al., News On-Demand for Multimedia Networks, Proc. ACM International Conference on Multimedia, Anaheim, California USA, Aug. 2-6, 1993 11 pp. (1993).

MP3.com website (http://www.mp3.com) archived by web.archive.org in May 1999 at http://web.archive.org/web/19990508090942/www.mp3.com/Artist/artistfaq.php3 (69 pages).

P.W. Bagenal and S.M. Upton, "Customer Management and the Eurocypher Conditional Access System at British Satellite Broadcasting," British Satellite Broadcasting, UK, pp. 270-277, Sep. 21-25, 1990.

Preston Gralla, *How the Internet Works, Millenium eEdition*, Que Corporation (Macmillian Computer Publishing) (Aug. 1999).

RealPlayer 8 Plus User Manual, 112 pp, (Aug. 2000), at http://service.real.com/help/player/plus_manual.8/rppmanual.htm.

Real System Production Guide, 200 pp. (Dec. 12, 2000), at http://service.real.com/help/library/guides/production8/realpgd.htm.

Request for Inter Partes Reexamination for U.S. Patent No. 6,925,469 to Headings et al. under 35 U.S.C. section 311 and 37 C.F.R. section 1.913: dated Oct. 31, 2007.

Rod Underhill & Nat Gertler, *The Complete Idiot's Guide to MP3: Music on the Internet*, 2000.

Rodrigues, L.M. et al., Improving SMIL Documents with NCM Facilities, Multimedia Modeling '99, Oct. 4, 1999, 20 pp. (1999).

Rody, J.A. et al., A Remote Presentation Agent for Multimedia Databases, 1995 International Conference on Multimedia Computing and Systems (ICMCS'95) pp. 223-230 (1995).

Ron White, *How Computers Work, Millennium Ed.*, Quo Corporation (Macmillian Computer Publishing) (Sep. 1999).

Shareyourworld.com, archived by archive.org in Feb./Mar. 2000 (pp. 1-2).

Shareyourworld.com Web Site Archive (2000), available at http://web.archive.org/web/20000229135009/http://www.shareyourworld.com/about.phtml (pp. 1-15).

Shea, Peter, Leveling the Playing Field: A Study of Captioned Interactive Video for Second Language Learning, Journal of Educational Computing Research, vol. 22, No. 3, pp. 243-263 (2000).

Smith, Jason McC. Et al., An Orthogonal Taxonomy for Hyperlink Anchor Generation in Video Streams using OvalTine, Hypertext '00 Proc. of the Eleventh ACM on Hypertext and Hypermedia, 8 pp. (2000).

Swan, Karen, Exploring the Role of Video in Enhancing Learning from Hypermedia, J. Educational Technology Systems, vol. 25(2), 1996, pp. 179-188.

Swinehart, Daniel C. et al., A Structural View of the Cedar Programming Environment, ACM Transactions on Programming Languages AMD Systems, vol. 8, No. 4, pp. 419-490 (Oct. 1986).

Synchronized Mulimedia Integration Language (SMIL) 1.0 Specification, W3C Recommendation, Jun. 15, 1998, http://www.w3.org/TR/REC-smil/.

Synchronized Mulimedia Integration Language (SMIL) Boston Specification, W3C Working Draft, Nov. 15, 1999, 175 pages, http://www.w3org/TR/1999/WD-smil-boston-19991115/.

T. Horstmann & R. Bentley, "Distributed Authoring on the Web with the BSCW Shared Workspace System," StandardView, vol. 5, No. 1, Mar. 1997 (pp. 9-16).

ten Kate, Warner et al., Presenting Multimedia on the Web and in TV Broadcast, 3rd European Conference on Multimedia Applications, Services, and Techniques, 19 pp. (1998).

Viren, John et al., Distance Learning Over ATM/Sonet: The Distance Learning Environment Demonstration, J. of Education Technology Systems, Voil, 27, No. 3, pp. 231-243 (1999).

Washisaka, Mitsukazu et al., Video/Text Linkage System Assisted by a Concept Dictionary and Image Recognition, Proceedings of the Third IEEE International Conference on Multimedia Computer and Systems '96, pp. 334-339, Jun. 1996.

Wegener Announces MPEG-2 Based System for Broadcasters Using Micropolis Video Servers, Mar. 27, 1995.

Ackerman, D. et al., "Streaming Video Over the Internet," Connect, (Oct. 5, 1998), three pages.

Examiner's Answer for Reexamination Control No. 95/000,313 mailed Apr. 16, 2012, 5 pages.

Patent Owner Rebuttal Brief for Reexamination Control No. 95/000,313 filed May 16, 2012, 20 pages.

Herrmann, L., "MPEG-4 Interactive Services over IP," located at www.itu.int/TELECOM/wt99/cfp/auth/2697/pap_2697.doc, (Oct. 1999), pp. 1-6.

Pereira, F. et al., "MPEG-4—Opening New Frontiers to Broadcast Services," EBU Technical Review, (1999), pp. 1-14.

Request for Inter Partes Reexamination for U.S. Patent No. 7,780,592 to Hudson et al. under 35 U.S.C. § 311 and 37 C.F.R. § 1.913, and Exhibits 1 to 35; filed Sep. 14, 2012, 804 pages.

Amendment for Reexamination Control No. 95/002,358, filed Mar. 7, 2013, 441 pages.

Third Party Requesters Comments After Patent Owner Response Pursuant to 37 CFR § 1.947 for Reexamination Control No. 95/002,358, filed Apr. 8, 2013, 66 pages.

* cited by examiner

SYSTEM AND METHOD FOR INTERACTIVE VIDEO CONTENT PROGRAMMING

RELATED APPLICATION

This application is a continuation of U.S. application Ser. No. 13/228,181, filed Sep. 8, 2011, which is a continuation of U.S. application Ser. No. 12/930,456, filed Jan. 7, 2011 (abandoned); which is a continuation of U.S. application Ser. No. 09/921,097, filed Jul. 31, 2001 (now U.S. Pat. No. 7,870,592); which claims the benefit of U.S. Provisional Application No. 60/255,541, filed Dec. 14, 2000; all of which are incorporated by reference herein.

BACKGROUND OF THE INVENTION

Some interactive programs include digital video discs (DVDs) or resident client computer applications, which enable users to view ancillary content that relates to the primary content being viewed. For example, DVD movies (the primary content) can include other footage relating to the movie, such as interviews with the cast, the movie trailer, and outtakes. DVDs also exist that permit the user to connect to a universal resource locator (URL) through a browser when viewed on a personal computer. This experience, however, is limited in that the user must use the DVD to make such a connection and the user is unable to pause the video to interact with any ancillary content. In the case of DVDs without such Internet connectivity, the user can only navigate through the ancillary content embedded in the DVD, and cannot perform any real-time transactions (e.g., buy a copy of a movie soundtrack through an e-commerce transaction) or other user interaction.

Other interactive programs permit users to watch content (e.g., a television episode) and log onto a website afterwards to purchase items viewed during the show (e.g., a wristwatch worn by an actor in the show).

Some interactive programs in a broadcast environment utilize the vertical blanking interval (VBI) to insert data into the broadcast stream, thus enabling interactive functionality. For example, with web television, users may play along with game shows as they are being broadcast. However, this approach is limited to the broadcast arena where the primary content (e.g., a television show) cannot be interrupted while the user interacts with ancillary content.

While the foregoing interactive programs provide users with an enhanced experience, they are limited in providing real-time interactivity between the user and the content while the user is viewing the primary content and do not provide a user-friendly experience. Therefore there exists a need for interactive video content programming that permits the user to stop the video play to view ancillary content, and then continue video play from the point in time where play was stopped.

SUMMARY OF THE INVENTION

The present invention is directed to a system and methods for creating and distributing interactive video content (IVC). IVC includes the creation of interactive content using software tools (e.g., Flash™ and Shockwave®), and digital assets (e.g., a movie or television commercial), and distributing the created interactive content in real-time to a user over an Internet Protocol (IP)-based network (e.g., Internet and intranet), or other network supporting two-way communication, to provide an interactive user experience.

As used herein, the term "content" is meant to include all forms of viewable electronic information including, but not limited to, advertisements, promotions, music videos, motion pictures, and television programs. A preferred embodiment of the present invention is directed to a method for using an interactive video including displaying a video on a visual display, the video having at least one interface link associated therewith, the interface link adapted to be displayed on the visual display and being linked to ancillary content accessible over a network (wire or wireless); interacting with the interface link to access the ancillary content; interrupting the display of the video at a point in time; delivering the ancillary content to the visual display; and continuing the display of the video from the point in time where the display of the video was interrupted.

As used herein, the phrase "ancillary content" is meant to include any content or page of content linked to the primary content or content linked therefrom. Also as used herein, the phrase "visual display" is meant to include all types of video or audio-visual devices including, but not limited to, screens for computer and televisions, personal digital assistants, or any other device that provides visual content to a user. As used herein, the phrase "interface link" is meant to include any means that functions as a link between video content and another piece of content, for example, a hypertext link under an Internet protocol regime.

Each interface link is preferably associated with, or related to, content being displayed on the screen. For example, if the user is watching a basketball game, and the user is interested in a particular shoe worn by a basketball player, the user may select the interface link associated with the basketball player's shoe. Interacting with the interface link associated with the basketball shoe allows the user to access one or more pages of information or media content related to the shoe of interest, including retail information. During the user's interaction with the interface link, the video stream is paused until the user returns to or continues the video stream delivery. Thus, a user may freely interact with one or more interface links to gain more information about an object of interest being displayed without missing any of the primary content video. As used herein, the phrase "primary content" is meant to include any content first requested by or to be shown to the user.

The present invention is also directed to a method for creating an interactive video, including creating a link program adapted to interrupt the delivery of video to a visual display and provide access to ancillary content accessible over a network; encoding the video onto a storage medium adapted to store video content; associating the link program with the video; delivering the video to the visual display; and displaying the video on the visual display.

Once an interactive video has been created, it may be distributed in several ways. A preferred distribution channel is to stream the video over an Internet Protocol (IP)-based network (e.g., Internet and intranet). Interface links may be displayed with the video stream in several ways. For example, interface links may be delivered separately from the video stream such that the links overlay the video stream content when displayed to the user (a "floating" interface link), or the interface links may be embedded in the video stream itself. Delivering interface links separately from the video stream eliminates any need to modify the original video content to support one or more interface links. Interaction with the interface link provides the user access to at least one IP address, for example, a web page address.

The present invention provides real-time interactivity that permits the user to effortlessly make a real-time transaction during the viewing of the program. The present invention may also be used for advertisements and specialized e-commerce opportunities.

It is to be understood that both the foregoing general description and the following detailed description are exemplary and explanatory only and are not restrictive of the invention, as claimed.

The accompanying drawings, which are incorporated in and constitute a part of this specification, illustrate several embodiments of the invention and together with the description, serve to explain the principles of the invention.

DESCRIPTION OF THE PREFERRED EMBODIMENTS

Reference will now be made in detail to the present preferred embodiments (exemplary embodiments) of the invention, examples of which are illustrated in the accompanying drawings.

Figure 1:
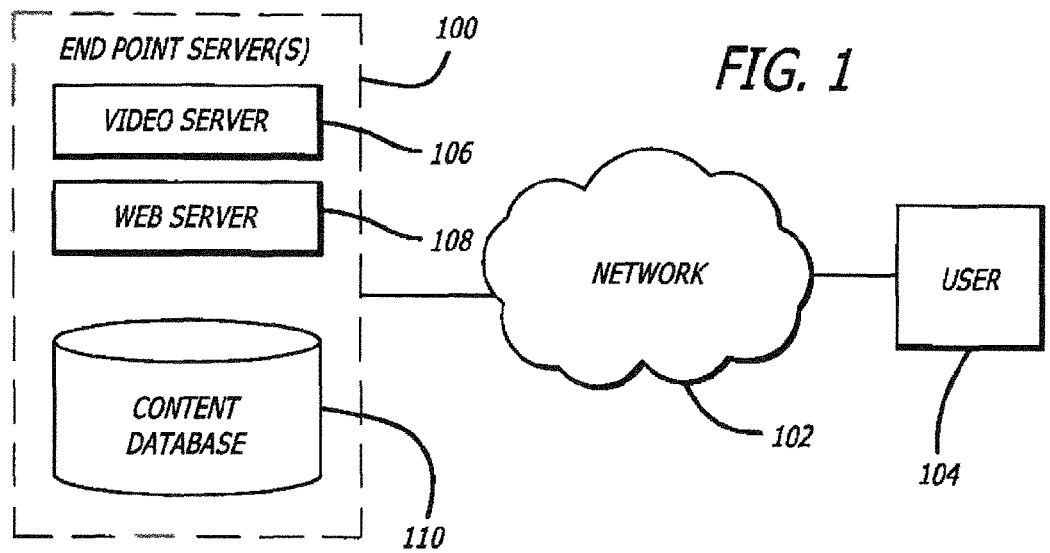
FIG. 1 is a schematic diagram of system components in accordance with a preferred embodiment of the present invention.

The present invention is directed to a system and methods for creating and distributing interactive video content. Unless otherwise stated, the present invention will be described in relation to using streamed video over an IP-based network such as the Internet, although a person of ordinary skill in the art will appreciate that other means of video delivery are possible and within the scope of the present invention. FIG. 1 is a schematic diagram of a preferred embodiment of the invention. As shown in FIG. 1, endpoint servers 100 deliver media content (e.g., movies, television shows, and ads) through a network 102 to one or more users 104. Network 102 may be any network that accommodates electronic delivery of content including, but not limited to, satellite transmission, wireless networks, digital subscriber lines, cable, and other communication networks. Endpoint servers 100 are preferably located in the vicinity of a service provider, such as an Internet service provider for example, in order to utilize the service provider's broadband network for streaming media content to a user and allow for more efficient communication between user 104 and endpoint server 100.

Endpoint servers 100 preferably include a video server 106, a web server 108, and a content database 110. It should be understood that endpoint servers 100 may include only one server. Video server 106 may be any server adapted to store and provide access to video content suitable for streaming to users. Web server 108 may be any server adapted to serve static images (e.g., JPEG or GIF), HTML assets (e.g., a retail website), text, and other IP-based file types (e.g., Flash™ and Shockwave®). A preferred form of web server 108 is a HTML server. Content database 110 preferably stores data for use with web server 108, and metadata associated with video content stored on video server 106 and may have a storage capacity expandable by known methods. It will be appreciated by those of ordinary skill in the art that in any of the embodiments of the present invention, the number of servers may range from one to many depending upon the system requirements to be met. Likewise, the system architecture between individual servers may be varied and load-balanced in known ways in order to provide optimal system efficiency.

Figure 2:
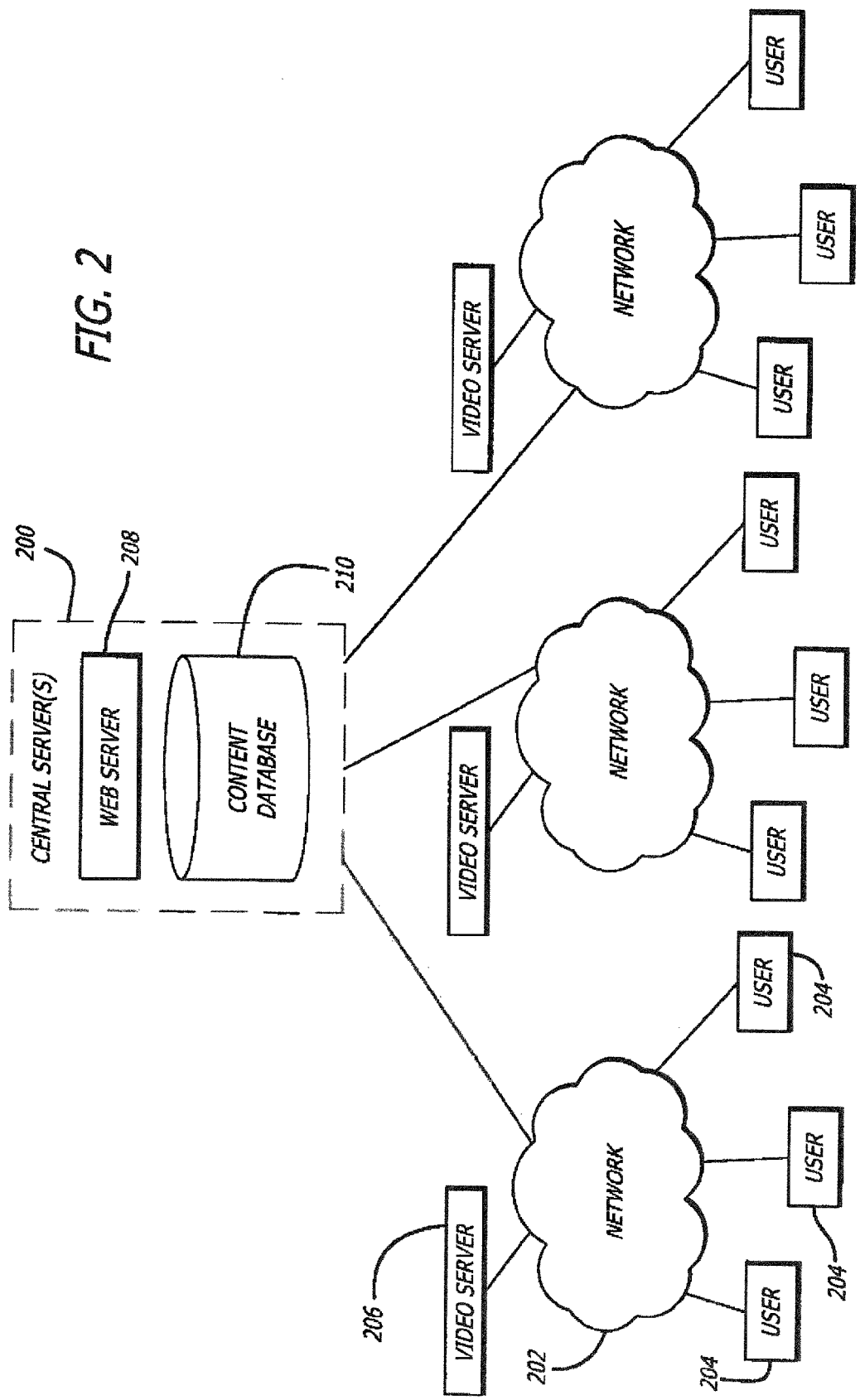
FIG. 2 is a schematic diagram of system components in accordance with another preferred embodiment of the invention.

FIG. 2 shows a preferred embodiment of the system of the present invention with the system components in a centralized architecture. Central servers 200 include a web server 208 and a content database 210. Web server 208 and content database 210 have similar functions as web server 108 and content database 110, respectively, shown and described in FIG. 1. Instead of being located regionally or locally in the vicinity of an Internet service provider, web server 208 and content database 210 are centrally located to provide access to a plurality of users 204 over a plurality of local or regional networks 202, each network 202 having associated therewith at least one video server 206. By centrally locating web server 208 and content database 210, media content may be more efficiently managed, for example, by reducing the amount of duplication otherwise required with greater numbers of servers and databases. It should be understood that central servers 200 may include only one server.

Figure 3:
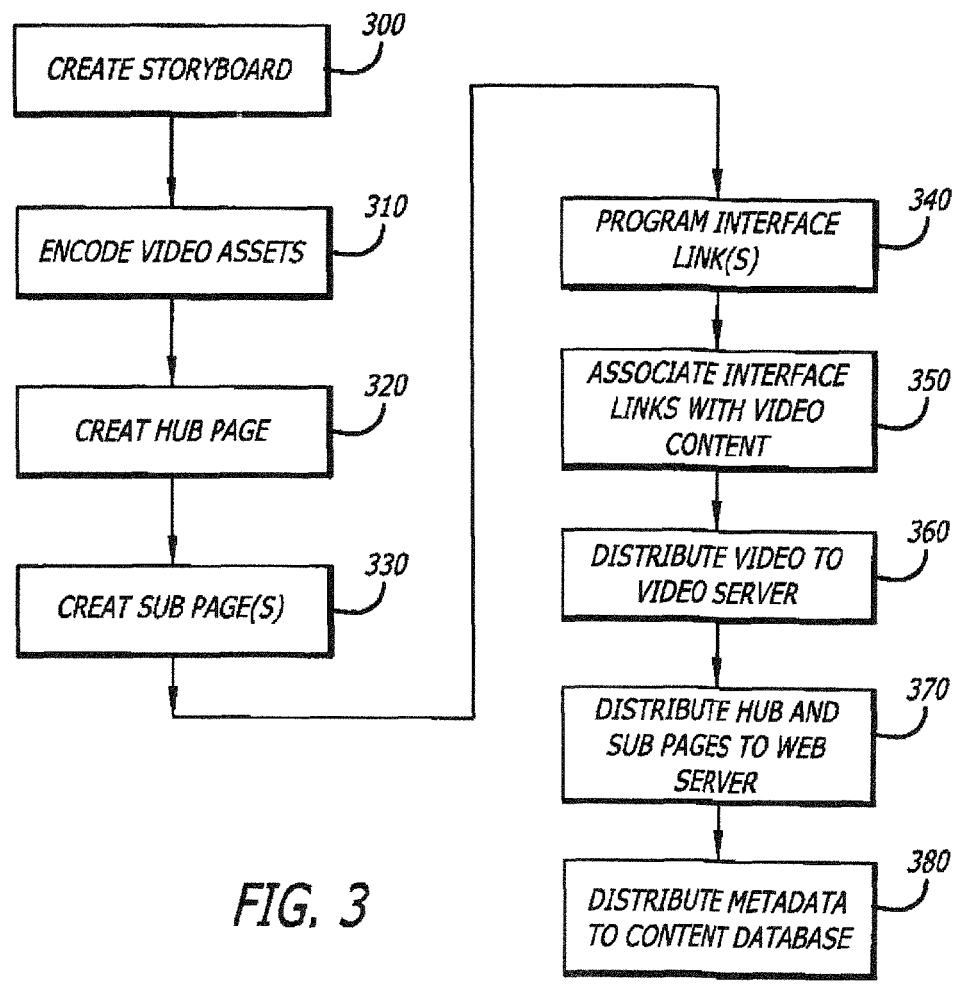
FIG. 3 is a logic diagram of a preferred method for creating interactive video content.

FIG. 3 shows a preferred method for creating interactive video content. In step 300, a preferably non-linear storyboard is created. A non-linear storyboard sets forth a flow of screens and/or images to be presented to the user during the user's interaction with the video content. A user may access one or more storyboards during the streaming of the video content via an interface link. Each interface link is preferably associated with a storyboard. Selecting or otherwise interacting with an interface link permits a user to access information or media content associated with a streamed object that the interface link is linked to. The storyboard preferably includes a "hub page" (the first page the user sees after interacting with the interface link) and at least one "sub-page" (any page linked to the hub page). Any of the storyboard pages may be, for example, a web page using graphics and/or text, or a streamed video asset. By being non-linear, a user may be presented with a plurality of choices at each level of selection (e.g., at the hub page and any number of subsequent sub-pages).

In step 310, video and/or audio assets are encoded. Encoding step 310 includes converting video and/or audio assets into computer files that are readable by an application adapted to show video to a user, for example, a media player application. Video content is preferably encoded as ASF, MPEG4 files to take advantage of encryption opportunities. However, interactive media files may also be encoded as, for example, Quick-Time™ files or AVI video files. A preferred encoding software is Windows® Media Encoder 7.0™. Preferably, both primary video content (i.e., the video initially requested by the user) and any ancillary video content (i.e., video that may be viewed while the primary video content is paused) are encoded onto the same storage medium. As a person of ordinary skill in the art will recognize, various software applications may be used to encode content without departing from the scope of the present invention.

In step 320, one or more hub pages may be created. Hub pages are created using any software tool adapted to create and populate IP-based pages (e.g., web pages). Preferred software includes, for example, Flash™, Shockwave®, HTML, and DHTML. In step 330, one or more sub-pages are created using tools such as those used to create hub pages. Hub pages preferably include a link back to the point at which the video content stream was paused or interrupted, and one or more links to sub-pages. Sub-pages themselves may include links to more sub-pages, or a back link to the hub page or to the interruption point of the video. Each hub page or sub-page may include one or more links to commerce sites. As used herein, the phrase "commerce site" is meant to include a site residing at an electronic address that is adapted to handle commercial transactions, for example only, a retailer website using an IP address.

After the hub pages and sub pages are created, they are preferably entered into a content management system for tracking and display purposes. "Tracking" includes accounting for the exhibition of the video asset by means of a unique identifier. A preferred example of a content management system operable with the present invention is taught in U.S. application Ser. No. 09/921,100, titled "Content Management System," filed Jul. 31, 2001, which claims priority to U.S. Application No. 60/280,691, the disclosures of which are hereby incorporated by reference herein.

The creation of links is described in more detail below. Hub pages and sub-pages may be stored, for example, on web server 108, 208, a retailer site, or on client software at the user's location.

In steps 340 and 350, interface links are programmed according to the intended method of presentation and associated with a piece of video content, whether primary or ancillary.

Interface links may be presented in several ways on a user's visual display. For example, interface links may be embedded in the video content such that the links are streamed with the video content from video server 106, 206. Embedded interface links may be created by on-line software such as Smoke® (available from Discreet Logic™), Final Cut Pro® (available from Apple Computer™), or Avid® (available from Avid Technology™). Preferably, the embedded interface link is located in the lower left hand corner, inside the video delivery area intended for the visual display, just outside the intended delivery area for Internet protocol.

Interface links may also be hidden from view such that no icons are visible. In this instance a user may, for example, when selecting with a mouse, run the cursor over an object of interest (an on-screen object that the viewer is interested in learning additional information about). When the cursor contacts the on-screen object (e.g., a shoe worn by a player during a basketball game) an icon or other visual effect may appear signifying that an interface link is available for the object of interest. Hidden interface links may be created by embedding an interface link as an invisible layer on top of the streaming video with known editing applications that can generate navigational instructions via, for example, Lingo™ (available from Macromedia®), Visual Basic® ("VB"; available from Microsoft®), ActiveX® (available from Microsoft®), Corns, or DirectX® (available from Microsoft®).

Hidden interface links may be placed on the canvass of a video stream over a single pixel, or over a greater number of pixels about the display area. Hidden interface links may be adapted to serve a number of purposes such as detecting a full screen event like an indiscriminate key stroke or mouse function to trigger an event such as an HTML page call or a chapter advance to another video sequence. A hidden interface link may also be used with a single pixel to make a cursor change indicate a hot mouse event on a specific part of the video stream, or be used for marketing and/or user feedback.

Interface links may also be delivered from web server 108, 208 and shown on the user's display as an overlay on the streaming video, for example, as a visible, translucent icon (e.g., "floating bug") or other user interface (UI). User 104, 204 would then be receiving two simultaneous transmissions: one from video server 106, 206 and one from web server 108, 208. Interface links delivered from web server 106, 206 may be delivered as a timed program that coincides with the video content being streamed. In such an instance, interface links may be preprogrammed to interact with, for example, time code markers embedded in the video stream, such that one or more interface links may appear or disappear based on the time elapsed. The association of interface links with time code markers may be achieved by known video editing or encoding applications. The appearance of a time code marker may be triggered when a time code window of the application delivering the video, for example, a media player, reaches a selected frame. For example, an interface link may appear in the right hand corner of the user's display after five minutes have elapsed during a video presentation to coincide with the entrance of an object of interest (e.g., an automobile coming from the right corner of the display). This process is akin to laying a template over the user's display, rather than embedding interface links in the video stream.

It is appreciated that an interface link program may be delivered to client software operatively connected to the user's visual display to interact with video delivered from video server 106, 206. In this embodiment, delivery of the interface link program need not be simultaneously delivered with the video to the user since the interface link program would already be at the user's visual display. Links to and between non-video content between pages may also be programmed as needed. Multiple links may be associated with the video using a variety of formats (e.g., hidden or translucent icons) which change with both time and location as the video plays.

In step 360, video content is distributed to one or more video servers 106, 206. Video may be distributed by any means adapted to deliver video content from one location to another, for example, manual delivery, satellite transmission, wireless delivery, digital subscriber line, and cable. In step 370, hub pages and sub-pages are distributed to web server 108, 208. In step 380, metadata is distributed to content database 110, 210. Distribution mediums may be the same as those already mentioned in conjunction with video content distribution. It should be understood that the aforementioned steps need not be performed in a particular order. For example, the video assets may be encoded before the creation of the storyboard in step 300. The creation and distribution of the hub and sub-pages to web server 108, 208 may occur independently of the creation and distribution of the video assets to video server 106, 206. In addition, the creation and distribution of metadata to content database 110, 210 may occur independently of either of the above.

Figure 4:
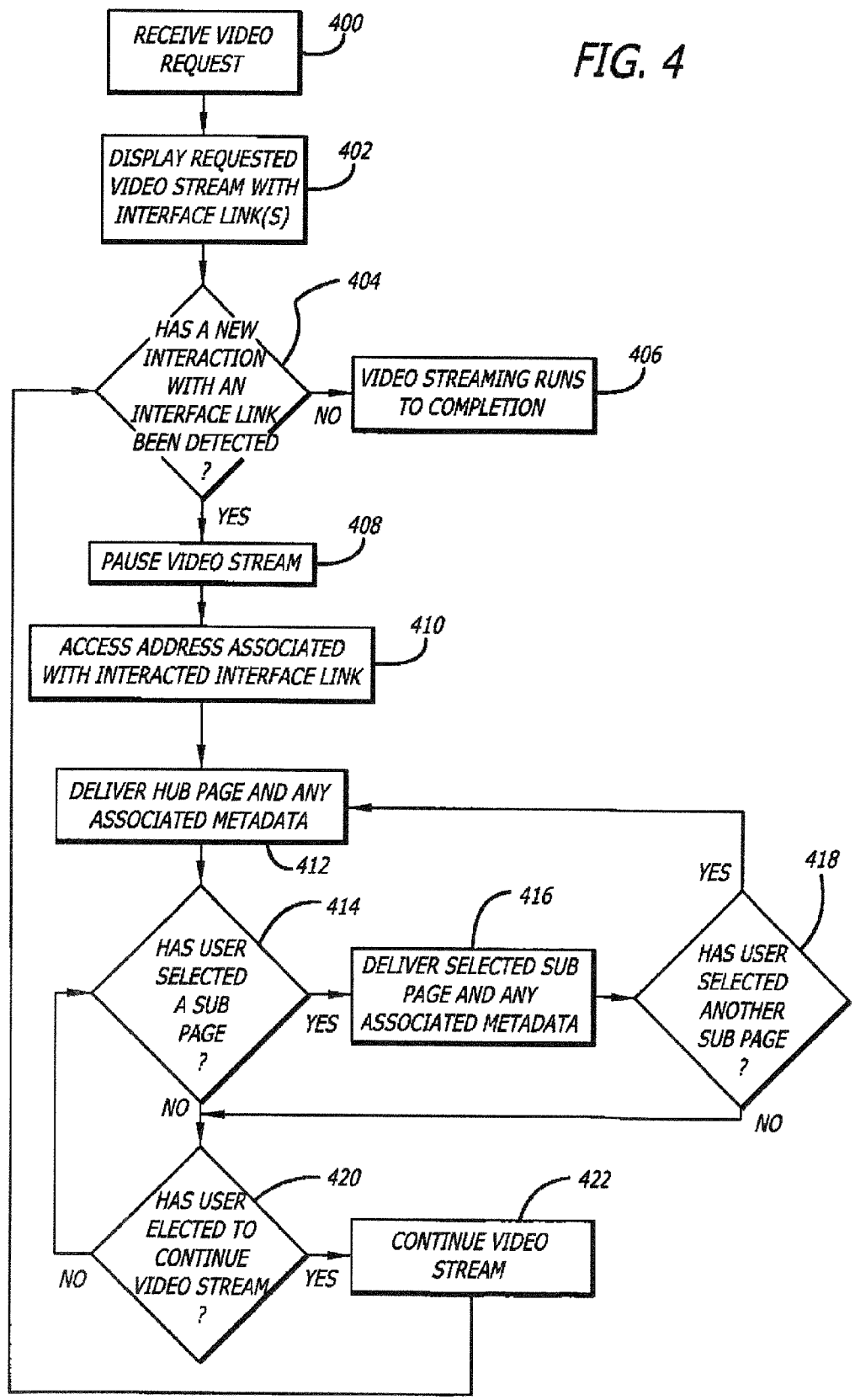
FIG. 4 is logic diagram of a preferred method for delivering interactive video content.

FIG. 4 shows a preferred method for delivering interactive video. In step 400, video servers 106, 206 receive a video request. In step 402, video servers 106, 206 stream requested video to the user's visual display. A preferred delivery program for streaming video content to user 104, 204, is Windows Media Player™. During video streaming, one or more interface links are delivered to the user's display and associated with the displayed video.

As a user is receiving a requested video stream, the user may be presented with one or more interface links. If the user decides to interact with an interface link in step 404, then the user selects a desired interface link corresponding to an object of interest. A user may interact with an interface link by, for example, touching an area of the display, voicing a command, pointing and clicking with a mouse, using a beam of light aimed at an area of the display, or any other interaction that conveys the user's desire to interact with an interface link.

Once an interaction with the interface link has been detected, in step 408 the video stream is paused or interrupted.

In step 410, the IP address associated with the interacted interface link is accessed. For example, in a web setting, a web page address is accessed and the user request is sent to the URL for the hub page, which is preferably served from a centrally located HTML server. In step 412, a hub page and any associated metadata with the accessed address are delivered to the user. The user may then view the hub page and make a sub-page selection in step 414. If the user selects a sub-page, then in step 416 a selected sub-page and any associated metadata is delivered to the user.

In step 418, the user may decide whether to request a different hub page, a previous hub page, or a new sub-page (though not illustrated, step 418 may loop to step 416 for as many times as a user desires to access a different sub-page). If the user decides not to select any further pages, then in step 420 the user may decide whether to continue the video stream in step 422. If the user does not elect to continue the video stream in step 420, then the user may continue to view the page that the user is viewing, or select one or more new pages and continue the video stream at anytime. Choosing to continue or return to the video stream will bring the user back to the point where the video streaming was interrupted. This may be done by a user action which activates the browser window containing the video stream.

After the video streaming has been continued, the user may select another link and thus repeat steps 404-422. It should be understood that the aforementioned steps need not occur in a particular order, or include all steps. For example, hub pages are not required to have sub-pages associated therewith. Therefore, in instances where a hub page has no associated sub-page, steps 414-418 may be omitted.

Each hub page or sub-page may contain e-commerce opportunities, i.e., retail information and/or links to retail sites for ordering desired items and completing commercial transactions. For example, during the presentation of an action film showing a snow-ski chase, a user might be interested in the brand of skis that a particular actor may be wearing. The user may select an interface link associated with the ski shown on the user's display. If the user is using a computer with a mouse, the user may simply point and click on the ski of interest, thereby pausing or interrupting the movie and delivering a hub page showing retail information regarding the particular ski of interest. The user may then choose among different sub-pages showing more information about the desired ski, or may order the ski from one or more of the pages.

Sub-pages may themselves contain video assets. For example, if a hub page contains information about an automobile, a sub-page link might lead to a video demonstration of the automobile's performance in various conditions. After exploring the hub page and any of various sub-pages, the user may elect to return to the primary video content at the point of interruption. It will be appreciated that the hub pages may or may not include ancillary video assets depending upon, for example, the system requirements and the storyboard intended to be designed around the primary content.

Interface link graphical images or icons (for visible icons) are preferably translucent to provide little distraction to the user during the video content presentation. For example, a preferred interface link includes a graphic that is slightly beveled, fifty percent transparent, and approximately 60 by 50 pixels in size. The icons may be created software such as, for example, Adobe® Photoshop™ and others.

Figure 5:
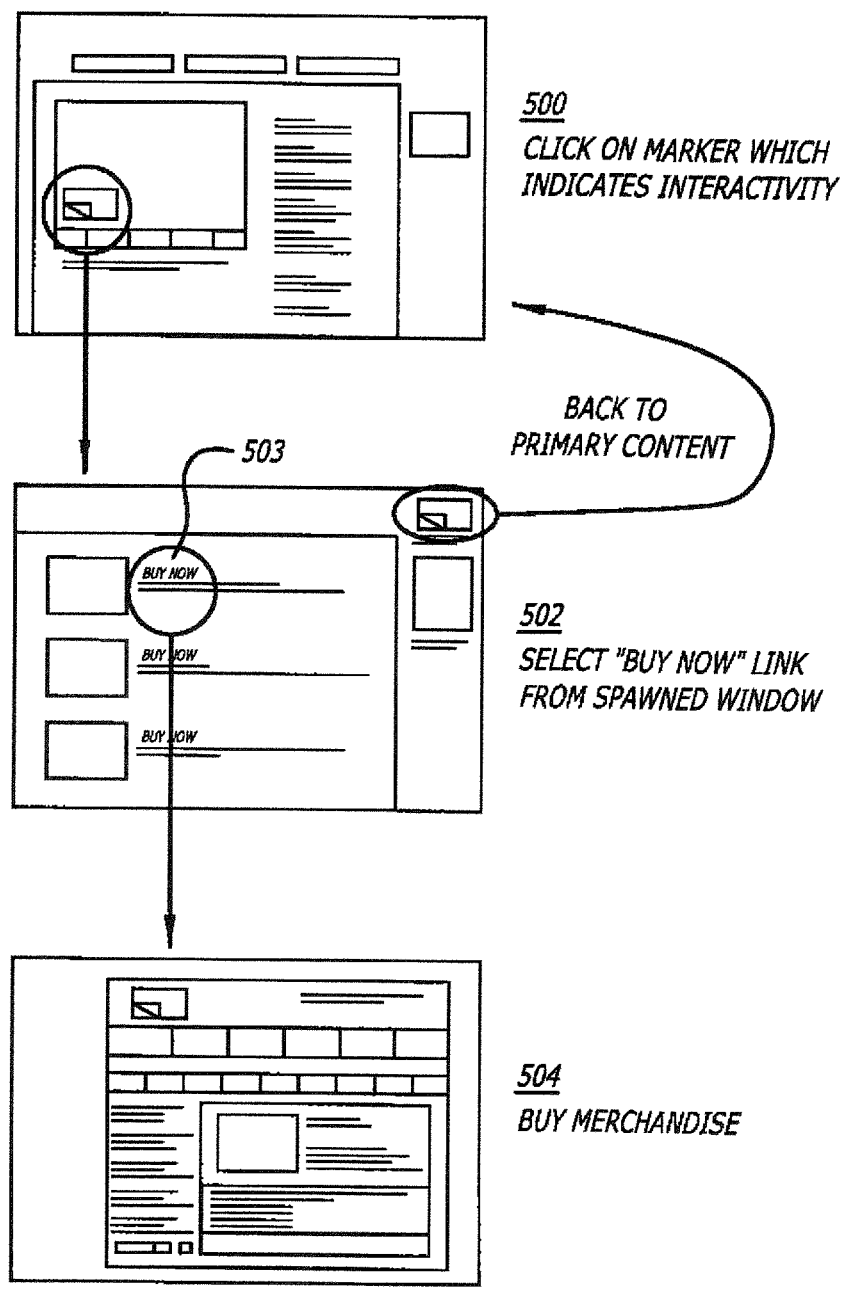
FIG. 5 is a logic diagram of a preferred method for conducting e-commerce through an interactive video.

FIG. 5 shows an example of an interaction with a storyboard having e-commerce opportunities. The user first requests the primary content (e.g., movie). When such a request is made, the primary content is streamed from video server network 106, 206 to the user with a marker indicating the availability of interactivity (e.g., the "floating bug"). If the user is interested in obtaining information about an object being displayed in the video (e.g., a coat worn by an actress), then in step 500 the user selects the "floating bug" associated with the object of interest. The primary content video stream is paused while the user request for information is sent to the URL for the hub page located on web server 108, 208. The hub page is then served to the user from web server 108, 208. If the user is interested in purchasing the object of interest (e.g., the coat), or any other object or service contained on the hub page, then in step 502 the user selects an interface link 503 labeled "buy now" associated with the object or service the user is interested in purchasing. Selecting interface link 503 connects the user with a retail web site having purchasing opportunities for the objects or services of interest. In step 504, the user proceeds to buy merchandise from the retail site. The retail site may be operated by a commercial entity responsible for presenting the primary video, or an outside entity. The retail web site may be a sub page served by web server 108, 208, or a web site located outside the system. At any point, the user may select an icon to revert to a previous page or the primary content. Set forth below are examples of preferred embodiments of the system and methods of the present invention:

Interactive Content Programming (ICP) includes several features:

1. ICP-enabled content will be visually distinguishable from other content via the translucent "bug" or other user interface (UI) linking element floating over the video content. The "floating bug" provides an interactive experience without modifying the primary content. This UI element both signals ICP availability, and accepts user "clicks" to trigger transition to the linked content.

2. If the ICP linking element is clicked, the UI is redirected to a programmed "place" (e.g., web page) that may include a variety of interactive content options. The place will be specified as a URL to be loaded over a current frame, or in place of the current page. The place may be an e-commerce opportunity, another video segment, or the like. In the most general case, any arbitrary URL (in any web-friendly format) may be the target. Preferably, multiple linkages from the video will be offered in a variety of formats (e.g., other than the translucent "bug"), which may be adapted to change with both time and space as the video plays.

3. When the user is done with the linked content and returns to the original video, it resumes at the point at which the user left it (i.e., the user does not miss a frame of original video).

An example of creating an ICP includes the following steps:

1. Create a non-linear storyboard. An example of a non-linear storyboard is found above in FIG. 5. The storyboard typically includes a "hub" page which is the first page the user sees when they click the "bug" to access the interactive content. The "bug" can link to the hub page or any page linked to from the hub. The hub page and all other sub pages preferably include a link back to the video where it left off, or in the case of a sub page, a link back to the hub page.

2. Encode the video assets and/or audio assets (e.g., the primary content and any ancillary content used on sub and hub pages) using encoding software (such as Windows Media Encoder 7.0™).

3. Utilizing software tools (e.g., Flash™, Shockwave®, HTML), create the hub page (e.g., a web page using graphics, text).

4. Utilizing software tools (e.g., Flash™, Shockwave®, HTML), create one or more sub pages (e.g., a web page using graphics, text).

An example of deploying an ICP includes the following steps:

1. For deployment of an ICP, the content management system allows content to include a URL for linking and accommodates "floating bug" insertion.

For each video asset associated with the ICP, the hub pages and sub pages are entered into the content management system for tracking and display purposes.

2. All HTML assets are placed on a central HTML server, which can be accessed by multiple versions of client applications (e.g., ".com" and ".tv" entities).

3. All of the video assets are distributed into the video server network (e.g., Akamai™). The video server network distributes the video content nationwide to individual users (i.e., client applications).

4. The client application is enabled to exhibit the ICP by modifying the content database accessible by the public to include the ICP.

Now the user can select the ICP and receive an interactive experience by requesting the primary content (e.g., movie). When such a request is made, the primary content is streamed from the video server network to the client application with the "floating bug." Upon the user selecting the bug (e.g., by clicking on the "bug"), the primary content video stream is paused and the user request is sent to the URL for the hub page located on the central HTML server. The hub page is then served to the client application from that central HTML server. The hub page may or may not include ancillary video assets also served from the video server network. A user may explore the hub pages and sub pages including any ancillary video assets and at any point click to return to the primary content where they left.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for creating an interactive video, the method comprising:
   encoding and storing the video onto a remote storage medium at a first site;
   creating a link program adapted to both:
      (a) interrupt streaming of the video at the remote storage medium to prevent streaming of the video over an Internet Protocol (IP)-based network to a second site; and
      (b) access ancillary content accessible over the network with a universal resource locator (URL) to a remote site where the ancillary content is stored, the link program linking the ancillary content and the video to a point in time when the streaming of the video from the remote storage medium is interrupted;
   associating the link program with the video;
   streaming the video over the network for display;
   providing the link program over the network;
   receiving an indication of an interaction with the link program; and
   interrupting, at the first site, the streaming of the video in response to receiving the indication of the interaction with the link program; and
   continuing the streaming of the video over the network from the point in time when the streaming of the video was interrupted.

2. The method of claim 1, wherein the continuing of the streaming includes detecting an activation of a browser window displaying the video.

3. The method of claim 1, wherein the continuing of the streaming includes detecting a selection of an icon.

4. The method of claim 1, wherein the link program is provided to client software at the second site prior to streaming the video over the network.

5. The method of claim 1, wherein the link program is provided to client software at the second site.

6. The method of claim 1, wherein the link program is stored at the second site prior to streaming the video over the network.

7. The method of claim 1, wherein the link program is not provided simultaneously with the streaming of the video over the network.

8. The method of claim 1, wherein the link program is provided simultaneously with the streaming of the video over the network.

9. The method of claim 1, wherein the link program is transmitted from the remote site as the video is being streamed over the network.

10. The method of claim 1, wherein the link program is embedded in the video being streamed over the network.

11. The method of claim 1, wherein the associating of the link program includes encoding the link program with the video onto the storage medium.

12. The method of claim 1, wherein the streaming of the video over the network includes delivering the link program in a feed separate from a feed of the video.

13. The method of claim 1, wherein the streaming of the video over the network includes overlaying the video with the link program while the video is displayed.

14. The method of claim 1, wherein the associating of the link program with the video includes embedding a time code marker in the video to permit the display of an interface link to the ancillary content based on the time elapsed during display of the video.

15. The method of claim 1, wherein the network includes a wireless network.

16. A method for providing an interactive video, the method comprising:
   streaming the video from a remote location over an Internet Protocol (IP)-based network for display on a visual display, the video having at least one interface link associated therewith, the interface link adapted to be displayed on the visual display and being linked by a universal resource locator (URL) to ancillary content accessible over the network;
   receiving an indication of an interaction with the interface link during the streaming of the video;
   in response to receiving the indication:
      (a) interrupting, at the remote location, the streaming of the video at a point in time so as to interrupt the streaming of the video over the network; and
      (b) initiating a command to transmit a request of the user for the ancillary content over the network to a remote site of the URL where the ancillary content to be delivered and displayed on the visual display is stored; and
   continuing the streaming of the video over the network from the point in time when the streaming of the video was interrupted.

17. The method of claim 16, wherein the continuing of the streaming includes detecting an activation of a browser window displaying the video.

18. The method of claim 16, wherein the continuing of the streaming includes detecting a selection of an icon.

19. The method of claim 16, wherein the interrupting of the streaming of the video includes pausing the video.

20. The method of claim 16, wherein the interface link is embedded in the video.

21. The method of claim 16, wherein the interface link is overlaid on the video on the visual display.

22. The method of claim 16, wherein the interface link originates from a feed separate from a feed of the video.

23. The method of claim 16, further comprising hiding the interface link from view on the visual display when there is no indication of an interaction with the interface link.

24. The method of claim 16, further comprising conducting a commercial transaction using the interface link, wherein the conducting of the commercial transaction includes accessing the ancillary content having a link to a site adapted to transact the commercial transaction.

25. The method of claim 16, wherein the ancillary content includes video.

26. The method of claim 16, further comprising conducting a commercial transaction using the ancillary content.

27. The method of claim 16, wherein the video has a plurality of the interface links associated therewith.

28. The method of claim 16, wherein the network includes a wireless network.

29. The method of claim 16, wherein the interface link is provided simultaneously with the streaming of the video.

30. The method of claim 16, wherein the interface link is not provided simultaneously with the streaming of the video.

\* \* \* \* \*